US012725611B1

(12) United States Patent
Garnaga et al.

(10) Patent No.: US 12,725,611 B1
(45) Date of Patent: Sep. 1, 2026

(54) SYSTEMS AND METHODS TO DETECT A BEGINNING OF INPUT SPOKEN BY A USER

(71) Applicant: Suki AI, Inc., Redwood City, CA (US)

(72) Inventors: Valerii Garnaga, San Jose, CA (US); Raghu P. Chalasani, San Jose, CA (US); Nicholas Piotrowski, Northglenn, CO (US); Vamsi Reddy Chagari, Milpitas, CA (US)

(73) Assignee: Suki AI, Inc., Redwood City, CA (US)

( * ) Notice: Subject to any disclaimer, the term of this patent is extended or adjusted under 35 U.S.C. 154(b) by 159 days.

(21) Appl. No.: 18/399,451

(22) Filed: Dec. 28, 2023

(51) Int. Cl.
*G10L 15/22* (2006.01)
*G10L 25/84* (2013.01)
*G10L 25/78* (2013.01)

(52) U.S. Cl.
CPC .............. *G10L 15/22* (2013.01); *G10L 25/84* (2013.01); *G10L 2015/223* (2013.01); *G10L 2025/783* (2013.01)

(58) Field of Classification Search
CPC ... G10L 25/84; G10L 2015/223; G10L 15/22; G10L 2025/783; G10L 25/78
See application file for complete search history.

(56) References Cited

U.S. PATENT DOCUMENTS

2017/0270919 A1* 9/2017 Parthasarathi .......... G10L 17/06
2019/0156818 A1* 5/2019 Piersol .................... G10L 25/87
2021/0295833 A1* 9/2021 Rastrow ................ G10L 15/222

* cited by examiner

*Primary Examiner* — Huyen X Vo
(74) *Attorney, Agent, or Firm* — Esplin & Associates, PC

(57) ABSTRACT

Systems and methods to detect a beginning of input spoken by a user are disclosed. Exemplary implementations may: obtain, in an ongoing manner, audio information representing sound captured by an audio section over an interval of time; determine an input beginning within the interval of time by determining a sequential set of the amplitude values that have reached or surpassed an amplitude threshold for a period of time; extract, from the audio information, an audio portion from the input beginning to an input end; analyze the audio portion to determine a function request to execute; determine whether execution of the function request requires server resources; responsive to determining the server resources are required to execute the function, transmit the function request to a server; and responsive to determining the server resources are not required to execute the function request, execute the function request.

18 Claims, 3 Drawing Sheets

SYSTEMS AND METHODS TO DETECT A BEGINNING OF INPUT SPOKEN BY A USER

FIELD OF THE DISCLOSURE

The present disclosure relates to systems and methods to detect a beginning of input spoken by a user.

BACKGROUND

Users often times are required to provide dictations in noisy environments where many other voices and/or noises may be present in a background. Because of the noisy environment, speech recognition system may fail at detecting when a foreground/main user has begun speaking.

SUMMARY

One aspect of the present disclosure relates to a system configured to detect a beginning of input spoken by a user. The system may include electronic storage, one or more hardware processors configured by machine-readable instructions, and/or other components. The machine-readable instructions may include one or more instruction components. The instruction components may include computer program components. The instruction components may include one or more of information obtaining component, input beginning determination component, portion extraction component, portion analysis component, execution determination component, and/or other instruction components.

The information obtaining component may be configured to obtain, in an ongoing manner, audio information representing sound captured by an audio section over an interval of time. The sound may convey input spoken by a user. The audio information may include amplitude values.

The input beginning determination component may be configured to determine an input beginning within the interval of time by determining a sequential set of the amplitude values that have reached or surpassed an amplitude threshold for a period of time.

The portion extraction component may be configured to extract, from the audio information, an audio portion from the input beginning to an input end.

The portion analysis component may be configured to analyze the audio portion to determine a function request to execute.

The execution determination component may be configured to determine whether execution of the function request requires server resources. The execution determination component may be configured to, responsive to determining the server resources are required to execute the function, transmit the function request to a server. The execution determination component may be configured to, responsive to determining the server resources are not required to execute the function request, execute the function request.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
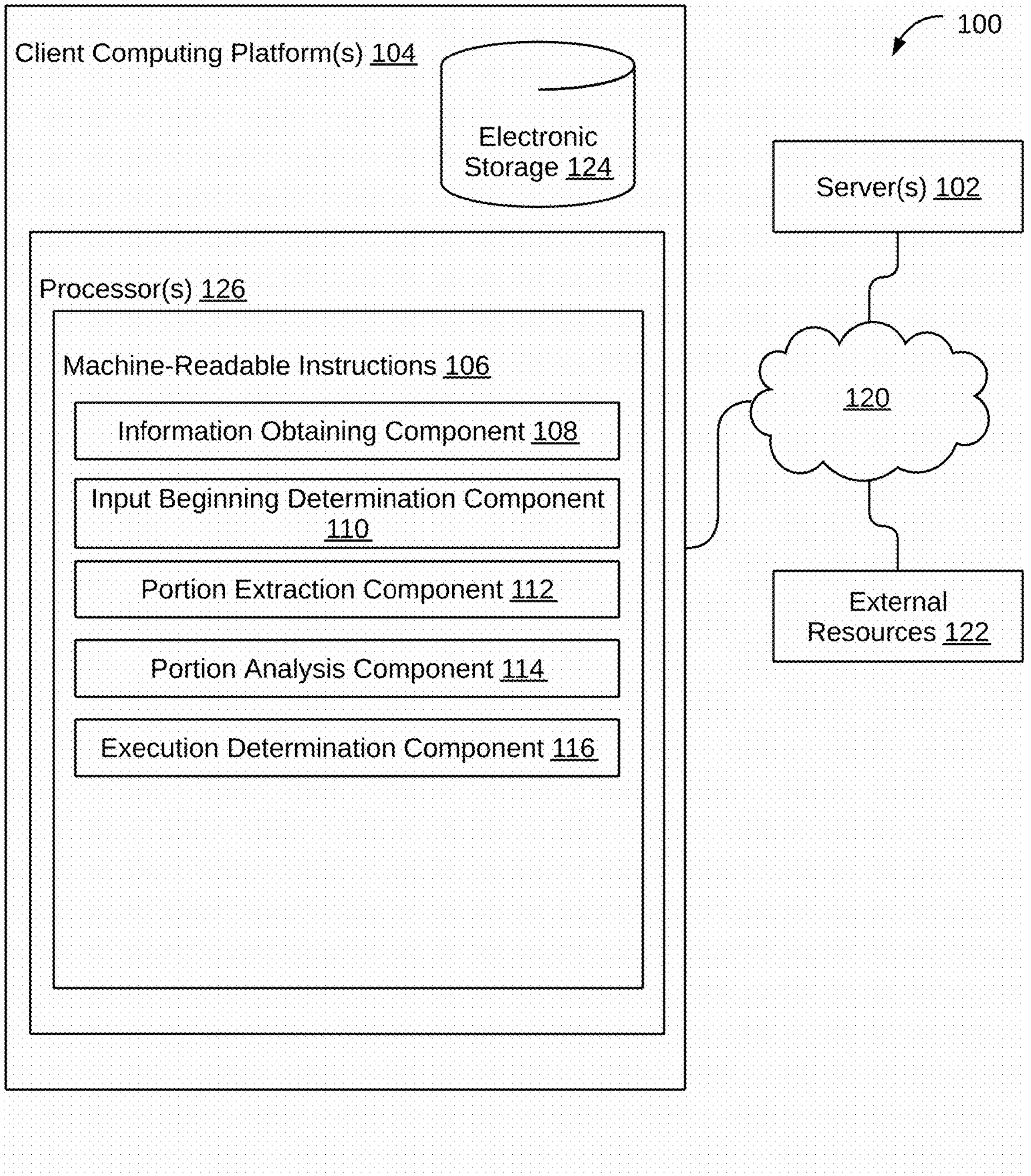
FIG. 1 illustrates a system configured to detect a beginning of input spoken by a user, in accordance with one or more implementations.

FIG. 1 illustrates a system 100 configured to detect a beginning of input spoken by a user, in accordance with one or more implementations. In some implementations, system 100 may include one or more client computing platforms 104, one or more servers 102, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Client computing platform(s) 104 may include electronic storage 124, may be configured by machine-readable instructions 106, and/or other components. Electronic storage 124 may store a list of commands, and/or other information. Individual ones of the commands on the list may be instructions that are uttered to cause a result. By way of non-limiting example, the commands may cause obtainment of particular information, performance of calculations (e.g., measurement conversions), note generation, formatting of a note, among others. Individual ones of the commands may be associated with time information. The time information may include an average amount of time required to utter the command, the maximum amount of time previous taken to utter the command, and/or other time information related to the commands and utterance thereof. The time information may be defined in time unit measurements including seconds, milliseconds, nanoseconds, and/or other time unit measurements.

Machine-readable instructions 106 may include one or more instruction components. The instruction components may include computer program components. The instruction components may include one or more of information obtaining component 108, input beginning determination component 110, portion extraction component 112, portion analysis component 114, execution determination component 116, and/or other instruction components.

In some implementations, one or more of the instruction components may be included in client computing platform (s) 104. In some implementations, the functionalities of one or more of the instruction components may be executed by instruction components included in server(s) 102. Client computing platforms 104, server(s) 102, external resources 122, and/or other components may communicate via network 120.

Information obtaining component 108 may be configured to obtain, in an ongoing manner, audio information representing sound captured by an audio section over an interval of time. The term “ongoing manner” as used herein may refer to continuing to perform an action (e.g., obtain) until receipt of an indication to terminate. The indication to terminate may include powering off client computing platform 104, charging one or more of a battery of client computing platform 104, resetting client computing platform 104, selecting or interacting with a user interface element (e.g., a virtual button, a physical button), and/or other indications of termination.

The audio section may be a part of client computing platform 104 and include an audio input device (e.g., microphone), an audio output device (e.g., speakers, headsets, earphones, hearing aids), and/or other audio components. The sound captured may convey input spoken by one or more participants, background noise, music, and/or other sounds. The one or more participants may include one or more users of system 100, a subject, and/or other participants. By way of non-limiting example, the user may be a caregiver (e.g., a doctor, a nurse, a physician’s assistant). The input spoken from the one or more participants may include words and/or phrases that comprise notes, commands, announcements, and/or other narrations or utterances. For example, the user may be audibly note taking.

In some implementations, the sound conveying the input spoken by the one or more participants may be detected by the audio input device, such as a microphone, of the audio section client computing platform 104. The audio information may include digital audio signals that encode sounds of individual utterances of the participants, a recording of the individual utterances of the participants, amplitude values, and/or other audio information. In some implementations, the sounds may be converted to the digital audio signals by converting analog waves to the digital audio signals by precisely measuring the analog waves at consistent and frequent intervals. The recording of the individual utterances may include a digital file of a reproduction of the digital audio signals that cause the sounds, and thus convey the utterances, the digital audio signals, and/or other recording.

Individual ones of the amplitude values may measure a displacement of a sound wave from an equilibrium position of the sound wave. The sound wave may be a type of energy that is transformed by vibrations of an object. The further the displacement of the sound wave from the equilibrium position, the louder a volume of the sounds represented by the audio information. Conversely, the closer the displacement of the sound wave to the equilibrium position, the quieter the volume of the sounds represented by the audio information. Thus, low amplitude values may be displacements measured closer to the equilibrium position than high amplitude values. The audio information may include multiple amplitude values from an audio beginning to an audio end. The audio beginning may refer to when capture the sound is first commenced, and the audio end may refer to when capture of the sound is terminated.

In some implementations, the audio information may include individual epoch times for the individual amplitude values and/or other values specified by the audio information, individual timestamps that are relative to commencement of the audio information (i.e., the audio beginning) for the individual amplitude values and/or other values specified by the audio information, and/or other time measurement for the individual amplitude values and/or other values specified by the audio information. The epoch time may include a month, a day, and a year, an hour, a minute, a second, a millisecond, a microsecond, a nanosecond, and/or other time unit measurements for precision. The audio beginning and/or the audio end may be associated with epoch times. The timestamps that are relative to commencement of the audio information may begin at zero such that the audio beginning is associated with the timestamp of zero, and the timestamps generate and increase as the sound is captured. The timestamps may be defined in seconds, milliseconds, microseconds, nanoseconds, and/or other time unit measurement.

The interval time may be a period of time that begins at an interval beginning. The interval beginning may refer to a point in time at which the interval of time begins. The capture of the sound, and the interval of time, may begin upon the user initiating the capture or at a defined time. For example, the initiation of the capture may include selecting the user interface element and/or other initiations. In some implementations, the defined time may be unmodifiable. In some implementations, the defined time may be modifiable by the user and/or an administrative user via client computing platforms 104.

In some implementations, information obtaining component 108 may be configured to generate the audio information based on the sounds in response to silence that follows individual ones of the utterances from the different participants, a change in the participant speaking detected, and/or user input via user interface elements (e.g., selecting the virtual button). In some implementations, the silence may be for a particular amount of time that may be fixed or modifiable by the user. In some implementations, the audio information may be stored in electronic storage 124 in association with one or more of the participants, in electronic storage included in server(s) 102, in cloud storage accessible to store to via network 120, and/or other storage.

Input beginning determination component 110 may be configured to determine an input beginning within the interval of time by determining a sequential set of the amplitude values that have reached or surpassed an amplitude threshold for a period of time. The sequential set of the amplitude values may be a set of amplitude values that consecutively measure at or surpass the amplitude threshold. In some implementations, the amplitude threshold may be relative to the amplitude values included in the audio information. That is, the amplitude values that have been measured and/or other values included in the audio information may convey that there is the background noise, the music, and/or other sound that is not utterances from the participants. The background noise may include, for example, button clicking (e.g., keyboard, mouse), doors opening and closing, traffic, and/or other background noises that are unavoidable. The other sounds that are not utterances from the participants may affect determination of the amplitude threshold so that regardless of the other sounds, the set of amplitude values that consecutively measure at or surpass the amplitude threshold may be determined. Determining the amplitude threshold based on the amplitude values and/or other values included in the audio information may include executing one or more known and/or novel formulas. In some implementations, the amplitude threshold may be predefined. In some implementations, the predefined amplitude threshold may be modified by the users.

Reaching or surpassing the amplitude threshold amplitude may refer to the amplitude values reaching the amplitude threshold or measuring less than the amplitude threshold. The amplitude values reaching or measuring less than the amplitude threshold may indicate that the volume of the sound captured has lowered despite the other sounds captured. Thus, the set of amplitude values may indicate that the user uttering input to be processed (e.g., a command) is likely.

The period of time may be a quantity of time that the sequential set of the amplitude values measured at or surpass the amplitude threshold. The period of time may be defined in second, milliseconds, and/or other time unit measurement. The period of time may be fixed or modifiable. By way of non-limiting example, the period of time may be modified by the user. Upon determination of the sequential set of the amplitude values, the input beginning may be indicated. The input beginning may be at the audio information subsequent to the last amplitude value in the sequential set of the amplitude values. The input beginning may indicate a commencement of an audio portion of the audio information that represents sounds conveying a probable utterance.

The probable utterance may be an utterance that is likely to be uttered by one of the participants. The probable utterance may be determined based on one or more previous utterances uttered by the participants as represented and conveyed by the audio information, a purpose of the utterances by the participants, and/or other information. By way of non-limiting example, the purpose of the utterances may be a schedule visit between the user and the subject (e.g., annual exam), note generation by the user, information obtainment from electronic storage 124 and/or other storage by the user, and/or other purposes.

The probable utterance may be an utterance of a wake word, a command from the list of commands, and/or other particular utterance to be analyzed. The wake word may be a term that signifies that one or more of the commands from the list of commands may follow. In some implementations, the wake word may be fixed. In some implementations, the wake word may be modifiable by individual ones of the users so that the individual users utter the wake word that is specific for them.

Portion extraction component 112 may be configured to extract, from the audio information, the audio portion from the input beginning to an input end. The audio portion may be a portion of the audio information that represents the sounds that convey the probable utterance. In some implementations, extraction of the audio portion may include generating a copy of the portion of the audio information that represents the sounds that convey the probable utterance. In some implementations, extraction of the audio portion may include removing the portion of the audio information that represents the sounds that convey the probable utterance from the audio information. The audio portion may be stored in electronic storage 124, cloud storage accessible via network 120, and/or other storage upon extraction. The input end may be a point of time during the interval of time at which the audio portion concludes. In some implementations, the input end may be an amount of time from the input beginning. That is, the input end is determined upon the amount of time transpiring after the input beginning. The amount of time may be based on the probable utterance.

The amount of time may be one second or other time amount upon the probable utterance being the wake word. The amount of time may be a maximum time upon the probable utterance being one of the commands from the list. The maximum time may be based on the time information associated with the commands included on the list and stored in electronic storage 124. In some implementations, the maximum time may be the longest maximum amount of time taken to utter any of the commands on the list. In some implementations, the maximum time may be fixed. In some implementations, the maximum time or the other time amount may be modified by the user.

Portion analysis component 114 may be configured to analyze the audio portion to determine a function request to execute. The function request may be a function that is being request based on the utterance conveyed by the audio portion (e.g., the command). The function may include activating command intake, executing one or more of the commands from the list, and/or other functions. Activating command intake may be initiated via utterance of the wake word to indicate that subsequent utterances may be one or more of the commands on the list.

In some implementations, execution determination component 116 may be configured to determine one or more of the commands from the list uttered by the user and thus conveyed by the audio portion. One or more of the commands on the list, such as the one or more commands uttered, may require one or more functionalities of server(s) 102 and thus server resources.

Execution determination component 116 may be configured to determine whether execution of the function request requires the server resources that are initiated by one or more components of server(s) 102. The server resources may include but are not limited to an electronic storage (e.g., electronic storage 124, the cloud storage) that stores a plurality of information, inventories of items managed by external resources 122, transmission initiating components to transmit the information from the electronic storage to other client computing platforms 104, and/or other server resources. The plurality of information may include electronic medical records, medical literature, a medication dictionary, and/or other information. Individual ones of the electronic medical records may include identifying information of the subject, prescriptions, illnesses and conditions, appointments, historical notes related to the subjects and visits or procedures, test results, and/or other information. It is to be noted that references to the medical field herein are for exemplary purposes only and are not intended to be limited as other applications are contemplated. The medical literature may include definitions of medical terms, procedures, illnesses, among others. The medication dictionary may include characterizations of medications, side effects, recommended usage time, recommended frequency, and/or other medication information.

The inventories of items managed by external resources 122 may include medications at pharmacies, prescriptions ordered, prescriptions fulfilled, medical supplies ordered, medical supplied fulfilled, among other items. The information transmitted from the electronic storage to other client computing platforms 104 may include the electronic medical records, imaging generated by machines (e.g., MRI images, X-rays, ultrasound images), portions of the medical literature, and/or other information.

Execution determination component 116 may be configured to, responsive to determining the server resources are required to execute the function, transmit the function request to server(s) 102 for execution. Alternatively, in some implementations, execution determination component 116 may be configured to initiation transmission of the function request to server(s) 102 responsive to determining the server resources are required to execute the function.

Execution determination component 116 may be configured to, responsive to determining the server resources are not required to execute the function request, execute the function request on client computing platform 104. For example, activating command intake may be executed by client computing platform 104. In some implementations, execution determination component 116 may be configured to communicate with external resources 122 to execute the function request. For example, performing calculations may be executable by client computing platform 104. As another example, obtaining portions of the electronic medical records (e.g., blood pressure and heart rate measured at beginning of visit) may be executed by client computing platform 104. The portions of the electronic medical records obtained may be presented via client computing platform 104. Presentation may include presenting visible content via a display of client computing platform 104 and/or an audible narration via the audio section.

Figures 3A, 3B:
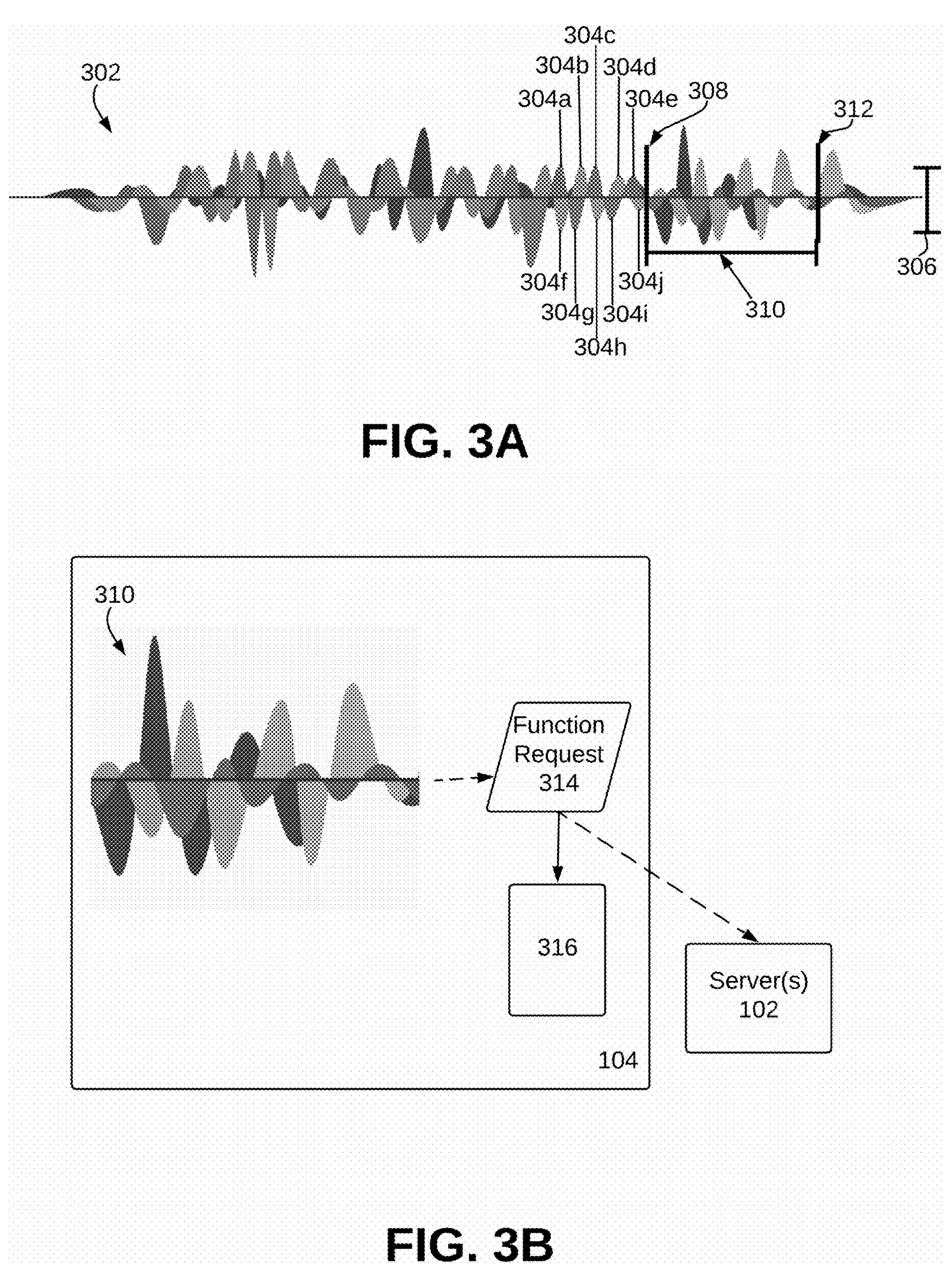
FIG. 3A-B illustrates an example implementation of the system configured to detect a beginning of input spoken by a user, in accordance with one or more implementations.

FIG. 3A illustrates audio information 302, obtained by client computing platform 104 illustrated in FIG. 1 and FIG. 3B, that specifies multiple amplitude values including amplitude values 304*a-j*, among others. Amplitude values 304*a-j* may reach or surpass an amplitude threshold 306. Amplitude values 304*a-j* either met amplitude threshold 306 or measured less than amplitude threshold 306. Based on amplitude values 304*a-j*, input beginning 308 may be determined. An audio portion 310 starting from input beginning 308 to an input end 312 may be extracted. Input end 312 may be a particular amount of time that transpired from input beginning 308.

FIG. 3B illustrates audio portion 310 extracted from audio information 302 in FIG. 3A. Audio portion 310 may be analyzed to determine a function request 314. Upon determination that server(s) 102 (the same illustrated in FIG. 1) is required to execute function request 314, function request 314 may be transmitted to server(s) 102. Upon determination that function request 314 is executable by client computing platform 104, function request 314 may be executed by client computing platform 104 such that content 316 is presented.

Referring back to FIG. 1, in some implementations, server(s) 102, client computing platform(s) 104, and/or external resources 122 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 122 may be operatively linked via some other communication media.

A given client computing platform 104 may include one or more processors configured to execute computer program components. The computer program components may be configured to enable an expert or user associated with the given client computing platform 104 to interface with system 100 and/or external resources 122, and/or provide other functionality attributed herein to client computing platform (s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 122 may include sources of information outside of system 100, external entities participating with system 100, and/or other resources. In some implementations, some or all of the functionality attributed herein to external resources 122 may be provided by resources included in system 100.

Server(s) 102 may include electronic storage 124, one or more processors 126, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 124 may comprise non-transitory storage media that electronically stores information. The electronic storage media of electronic storage 124 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 124 may include one or more virtual storage resources (e.g., cloud storage, a virtual private network, and/or other virtual storage resources). Electronic storage 124 may store software algorithms, information determined by processor(s) 126, information received from server(s) 102, information received from client computing platform(s) 104, and/or other information that enables server(s) 102 to function as described herein.

Processor(s) 126 may be configured to provide information processing capabilities in server(s) 102. As such, processor(s) 126 may include one or more of a digital processor, an analog processor, a digital circuit designed to process information, an analog circuit designed to process information, a state machine, and/or other mechanisms for electronically processing information. Although processor(s) 126 is shown in FIG. 1 as a single entity, this is for illustrative purposes only. In some implementations, processor(s) 126 may include a plurality of processing units. These processing units may be physically located within the same device, or processor(s) 126 may represent processing functionality of a plurality of devices operating in coordination. Processor (s) 126 may be configured to execute components 108, 110, 112, 114, and/or 116, and/or other components. Processor(s) 126 may be configured to execute components 108, 110, 112, 114, and/or 116, and/or other components by software; hardware; firmware; some combination of software, hardware, and/or firmware; and/or other mechanisms for configuring processing capabilities on processor(s) 126. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 126 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 126 may be configured to execute one or more additional components that may perform some or all of the functionality attributed below to one of components 108, 110, 112, 114, and/or 116.

Figure 2:
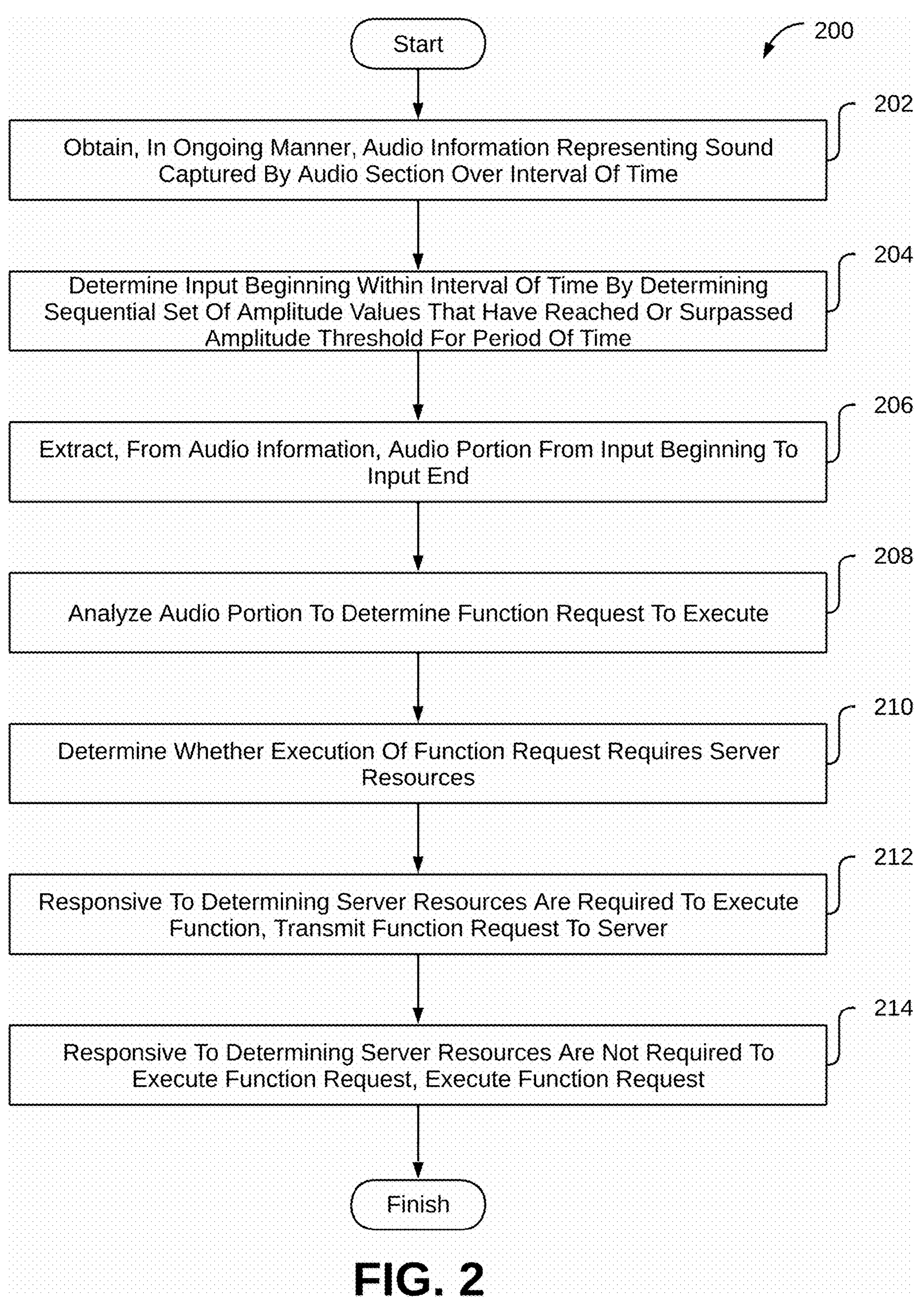
FIG. 2 illustrates a method to detect a beginning of input spoken by a user, in accordance with one or more implementations.

FIG. 2 illustrates a method 200 to detect a beginning of input spoken by a user, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining, in an ongoing manner, audio information representing sound captured by an audio section over an interval of time. The sound may convey input spoken by a user. The audio information may include amplitude values. Operation 202 may be performed by one or more hardware processors configured by machine-readable instructions including a component that is the same as or similar to information obtaining component 108, in accordance with one or more implementations.

An operation 204 may include determining an input beginning within the interval of time by determining a sequential set of the amplitude values that have reached or surpassed an amplitude threshold for a period of time. Operation 204 may be performed by one or more hardware processors configured by machine-readable instructions including a component that is the same as or similar to input beginning determination component 110, in accordance with one or more implementations.

An operation 206 may include extracting, from the audio information, an audio portion from the input beginning to an input end. Operation 206 may be performed by one or more hardware processors configured by machine-readable instructions including a component that is the same as or similar to portion extraction component 112, in accordance with one or more implementations.

An operation 208 may include analyzing the audio portion to determine a function request to execute. Operation 208 may be performed by one or more hardware processors configured by machine-readable instructions including a component that is the same as or similar to portion analysis component 114, in accordance with one or more implementations.

An operation 210 may include determining whether execution of the function request requires server resources. Operation 210 may be performed by one or more hardware processors configured by machine-readable instructions including a component that is the same as or similar to execution determination component 116, in accordance with one or more implementations.

An operation 212 may include responsive to determining the server resources are required to execute the function, transmitting the function request to a server. Operation 212 may be performed by one or more hardware processors configured by machine-readable instructions including a component that is the same as or similar to execution determination component 116, in accordance with one or more implementations.

An operation 214 may include responsive to determining the server resources are not required to execute the function request, executing the function request. Operation 214 may be performed by one or more hardware processors configured by machine-readable instructions including a component that is the same as or similar to execution determination component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to detect a beginning of input spoken by a user, the system comprising:

a client computing platform configured by machine-readable instructions to:

obtain, in an ongoing manner, audio information representing sound captured by an audio sensor over an interval of time, wherein the sound conveys input spoken by a user, wherein the audio information includes amplitude values;

determine an input beginning within the interval of time by determining a sequential set of the amplitude values that have reached or surpassed an amplitude threshold for a period of time, wherein the sequential set includes consecutively measured ones of the amplitude values;

determine a probable utterance represented by the sound;

determine an input end based on an amount of time transpiring after the input beginning, wherein the amount of time is based on stored time information associated with the probable utterance;

extract, from the audio information, an audio portion from the input beginning to the input end;

analyze the audio portion to determine a function request to execute;

determine whether execution of the function request requires server resources;

responsive to determining the server resources are required to execute the function request, transmit the function request to a server; and responsive to determining the server resources are not required to execute the function request, execute the function request.

2. The system of claim 1, wherein the amplitude threshold is relative to the amplitude values included in the audio information.

3. The system of claim 1, wherein the amount of time is specific to the probable utterance.

4. The system of claim 1, further comprising an electronic storage that stores a list of commands and the time information, wherein the probable utterance is an utterance of (i) a wake word or (ii) a command from the list of commands.

5. The system of claim 4, wherein the probable utterance is the wake word, and wherein the amount of time is one second upon uttering the probable utterance.

6. The system of claim 4, wherein the probable utterance is the command, and wherein the amount of time is an average amount of time or a maximum amount of time associated with uttering the probable utterance.

7. The system of claim 1, wherein the input beginning is determined as being subsequent to a measurement of a last amplitude value in the sequential set.

8. The system of claim 1, wherein the period of time is modifiable by the user.

9. The system of claim 1, wherein the client computing platform is further configured by the machine-readable instructions to determine the amplitude threshold.

10. A method to detect a beginning of input spoken by a user, the method comprising:

obtaining, in an ongoing manner, audio information representing sound captured by an audio sensor over an interval of time, wherein the sound conveys input spoken by a user, wherein the audio information includes amplitude values;

determining an input beginning within the interval of time by determining a sequential set of the amplitude values that have reached or surpassed an amplitude threshold for a period of time, wherein the sequential set includes consecutively measured ones of the amplitude values;

determining a probable utterance represented by the sound;

determining an input end based on an amount of time transpiring after the input beginning, wherein the amount of time is based on stored time information associated with the probable utterance;

extracting, from the audio information, an audio portion from the input beginning to the input end;

analyzing the audio portion to determine a function request to execute;

determining whether execution of the function request requires server resources;

responsive to determining the server resources are required to execute the function request, transmitting the function request to a server; and responsive to determining the server resources are not required to execute the function request, executing the function request.

11. The method of claim 10, wherein the amplitude threshold is relative to the amplitude values included in the audio information.

12. The method of claim 10, wherein the amount of time is specific to the probable utterance.

13. The method of claim 10, further comprising storing, in electronic storage, a list of commands and the time information, wherein the probable utterance is an utterance of (i) a wake word or (ii) a command from the list of commands.

14. The method of claim 13, wherein the probable utterance is the wake word, and wherein the amount of time is one second upon uttering the probable utterance.

15. The method of claim 13, wherein the probable utterance is the command, and wherein the amount of time is an average amount of time or a maximum amount of time associated with uttering the probable utterance.

16. The method of claim 10, wherein the input beginning is determined as being subsequent to a measurement of a last amplitude value in the sequential set.

17. The method of claim 10, wherein the period of time is modifiable by the user.

18. The method of claim 10, further comprising determining the amplitude threshold.

* * * * *